United States Patent [19]

Griffin et al.

[11] 4,388,853
[45] Jun. 21, 1983

[54] MISSILE LAUNCHERS

[75] Inventors: Denis Griffin, Guildford; John F. Adie, Great Bookham, both of England

[73] Assignee: Frazer-Nash Limited, Kingston-Upon-Thames, England

[21] Appl. No.: 178,255

[22] Filed: Jul. 24, 1980

[51] Int. Cl.³ .............................................. B64D 1/02
[52] U.S. Cl. .............................. 89/1.5 F; 244/137 R; 89/1.5 G; 89/1.811; 89/1.813
[58] Field of Search ................ 89/1.5 F, 1.5 G, 1.5 B, 89/1.806, 1.811, 1.814, 1.813, 1.815; 244/137 R; 294/83 AE

[56] References Cited

U.S. PATENT DOCUMENTS

| | | | |
|---|---|---|---|
| 3,056,623 | 10/1962 | Herbert | 89/1.5 F X |
| 3,610,094 | 4/1969 | Craigie | 89/1.5 F |
| 3,784,132 | 1/1974 | Newell | 89/1.5 F X |
| 3,871,604 | 3/1975 | Coutin | 244/137 R |
| 3,883,097 | 5/1975 | Billot | 244/137 R |
| 4,043,525 | 8/1977 | Jackubowski | 89/1.5 F X |
| 4,050,656 | 9/1977 | Peterson | 89/1.5 F X |

FOREIGN PATENT DOCUMENTS

| | | | |
|---|---|---|---|
| 1058997 | 2/1967 | United Kingdom | 244/137 R |
| 1088571 | 10/1967 | United Kingdom | 244/137 R |

Primary Examiner—David H. Brown
Attorney, Agent, or Firm—Howard L. Rose

[57] ABSTRACT

A missile launcher having fore and aft two-stage double-acting ejection rams is provided with a choked flow gas system to prevent interaction between the rams and avoid back pressure in the breech chambers. Two gas cartridges in two breech chambers supply ejection gas pressure and a third cartridge in a third breech chamber supplies gas for subsequently retracting the rams. The ejection gas pressure also actuates mechanisms for releasing fore and aft missile suspension hooks and crutching assemblies, and for withdrawing an umbilical electrical service plug. Each ram comprises an outer casing, an inner fixed hollow shroud tube and two relatively-moving members with annular pistons that extend telescopically from within the space between the casing and the shroud tube, the ejection gas being admitted down the interior of the shroud tube. The aft ram has a yoke to engage the missile and the forward ram a side plate. The forward crutching assembly comprises a spring-loaded coned nut and the aft crutching assembly a spring-loaded wedge.

25 Claims, 14 Drawing Figures

MISSILE LAUNCHERS

This invention relates to missile launchers.

There is a requirement for an aircraft-borne missile launcher, to be carried under or semi-buried in the underneath of the aircraft fuselage, which will eject the missile downward prior to ignition for a considerable distance away from the fuselage while at the same time holding the missile secure in order to maintain target acquisition. The ejection movement must be rapid, i.e. it is required to achieve a high velocity in a limited stroke, but there is a maximum acceleration which must not be exceeded.

According to the present invention, there is provided a missile launcher having fore and aft rams supplied with gas pressure from gas cartridges via a choked flow gas system. The rams may be two-stage rams designed for substantially uniform acceleration and constant thrust; and because of the employment of choked flow nozzles in the gas system it is not possible for the thrust of one ram to react on the other or for the variation in ram force due to externally applied loads to affect the rate of generation of gas from the cartridges.

In the preferred arrangement, two large gas cartridges are fired in sequence. The gas from the first cartridge pressurises the system, while the gas from the second cartridge, which may contain about twice as much propellant, does the work of extending the rams. Each two-stage ram contains a telescopically-sliding support tube and ram piston. During the first stage of ram extension both the support tube and the ram piston extend together. Then in the second stage when the support tube is fully extended, the ram piston extends alone. A third cartridge may be provided to supply gas for retracting the rams after the missile has been ejected.

Gas from the initial ejection supply also may be employed for an operating mechanism to release the suspension hooks holding the missile prior to ejection, and to detach an umbilical electrical service plug connection from the missile. Firing of the missile propulsion system may be initiated by the operation of two switches, one for each ram, as the rams reach a predetermined condition of extension.

It is necessary to adjust the relative flows of gas to the fore and aft rams, and this adjustment may need to be different according to where the launcher is sited on the aircraft fuselage. Advantageously, this adjustment is performed by means of a one-piece rotatable throttle having a selection of gas flow bores of different sizes. By using a single throttle member to adjust the gas flows to both rams, incorrect combinations of settings are avoided.

One embodiment of missile launcher in accordance with the invention will now be described by way of example, with reference to the accompanying drawings, in which.

The launcher to be described is one of four such units that are to be mounted in left and right-handed tandem pairs, disposed side by side, under the aircraft fuselage. To prevent fouling of the missile wings, the starboard pair is offset forward with respect to the port pair.

In its carried position, the missile is semi-enclosed within the aircraft skin, with its longitudinal axis approximately parallel to the aircraft datum. The missile upper vertical wing and fin engage in slots in the aircraft structure, and automatic crutching systems limit movement of the missile in flight. When the missile is ejected, two interlinked hooks from which the missile is suspended are released, and gases from two cartridges operate two telescopic rams to eject the missile in a direction at right angles to the aircraft datum. Before the rams have completed their strokes, switch contacts controlled by each ram close to initiate starting of the missile propulsion unit.

After the separation of missile and launcher, gases from a retraction cartridge retract and latch both rams back into their original positions, leaving only a ram sole plate on the end of the forward ram and a yoke on the end of the aft ram exposed to the slip-stream. Both of these items are faired in order to minimise aerodynamic drag effects.

Up to the time of ejection, the missile is connected to the aircraft guidance system via an umbilical plug and socket arrangement. The same mechanism that releases the missile suspension hooks also withdraws the umbilical plug from the mating missile socket and within the aircraft skin profile.

To prevent rotation of the forward ram sole plate and aft ram yoke after the ejection of the missile, two pairs of torque links are attached to the launcher body at one end and to the ram sole plate, or yoke, at the other. The torque links extend with the rams, and return into launcher body slots on retraction. The links are hollow, and the aft links contain the missile propulsion unit starting cable which is routed to a connector on the ram yoke. The position of the links is used to operate the missile motor fire switches by way of lever extensions.

Missile ejection is initiated electrically from the cockpit, and the launcher switches operate indicators to show the condition of the launcher prior to and after ejection of the missile. Failure of either ram to retract is shown as a 'Ram Deployed' indication.

Figure 1:
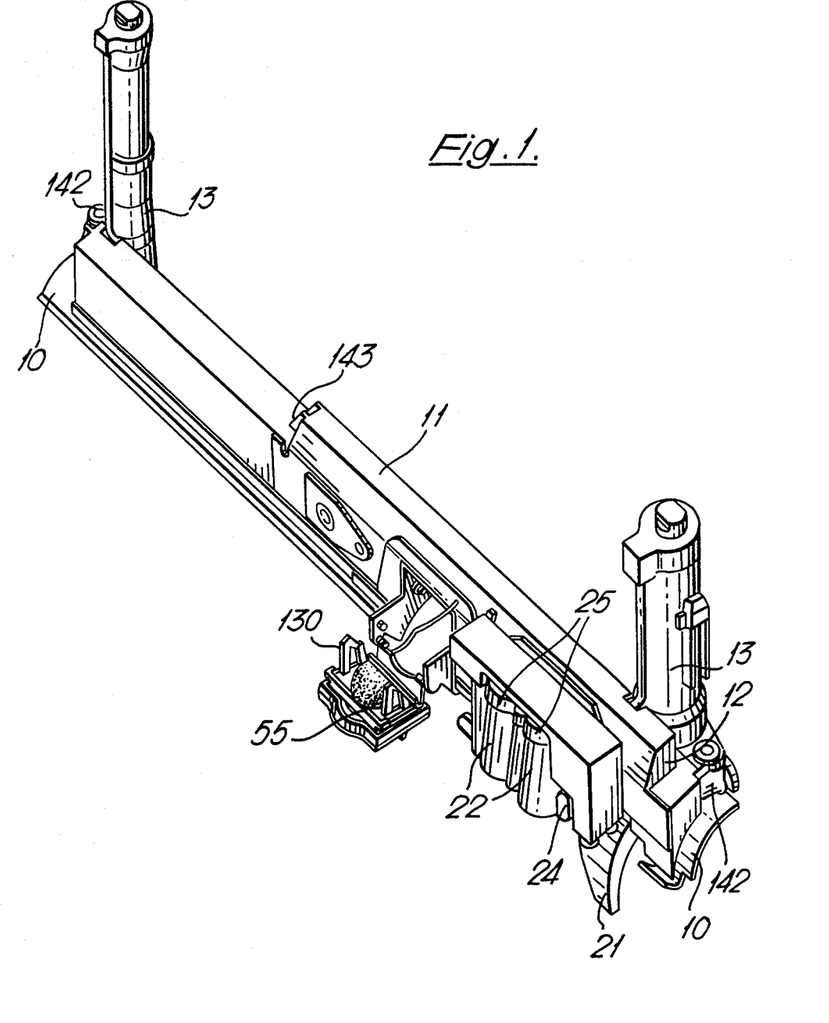
FIG. 1 is a diagrammatic pictorial view of the launcher from above.

Referring to FIG. 1, the launcher body consists of a fabricated main channel member 11 of inverted 'U' section, which terminates at each end in an end cap assembly 12 to which the ram casing 13 are bolted. Attached to the bottom edges of the channel member are plates 10, curved to accommodate the curvature of the missile, and with a perimeter contoured to match the aircraft skin-line.

The forward and aft ram assemblies are similar and only differ significantly in their diameters and in the ram extremities. Each unit (FIG. 2) consists of three concentric tubes forming a ram casing 13, a support tube 14, and a ram 15. When a ram unit operates, the support tube 14 and ram 15 extend as an entity until the support tube reaches the end of its stroke. Latches 16 are then released and the ram 15 continues to full extension by itself, guided and supported by the support tube 14.

Figure 2:
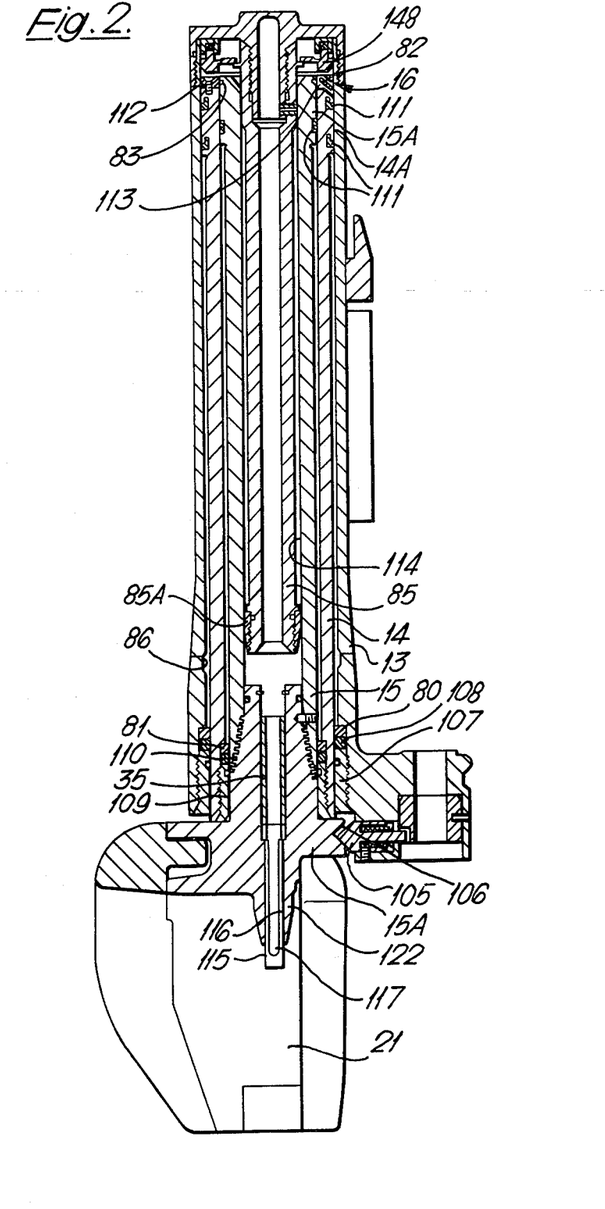
FIG. 2 shows the aft ram of the launcher in longitudinal section.

When the ram unit retracts, the ram latches 16 re-engage and a spring wedge 105 on the ram casing 13 engages in a detent 106 in an extension or foot 15A on the ram latching the unit in the retracted position.

Within the ram casing 13 the support tube 14 slides in a bearing collar 107 that is screwed into the bottom of the ram casing. The collar secures a rubber buffer 108 and a steel buffer-ring 80 that acts as a down stop for the support tube. The ram 15 slides in a bearing collar 109 in the support tube 14. This collar also acts as a stop, and retains a buffer 110 and ring 81 to arrest the ram piston at its lowest position. The pistons 14A, 15A of both support tube 14 and ram 15 are fitted with gas sealing rings 111. At the top end of the ram casing a buffer ring 148 is provided.

Secured to the top face of the support tube piston 14A is the latch ring assembly 16. This consists of three pivoted radial latches 82 inset into recesses 113 equi-spaced around a retaining ring 112. The latch pivot pins are located in a groove machined in the support tube end face. The retaining ring with its three recesses provides a pivot fulcrum for each latch and secures all components in position.

Each latch 82 is slightly longer than the thickness of the support tube wall and therefore projects into the ram piston bore, when the ram assembly is nested. The retaining ring recesses 113 are contoured to allow the inner end of each latch to pivot upwards from a normally horizontal position in which they are retained by pivot pin spring pressure. Thus, during retraction, the rising ram piston edge strikes the latches, which pivot upwards as the rising piston end passes. The piston then falls back to its normal rest position and the latches, pressed into contact with the ram piston wall, engage an annular groove 83 in the piston wall near its top. This groove is of a depth sufficient to accommodate the projection of the latches into the piston bore. Thus, the support tube 14 and ram piston 15A are "locked" together preventing the ram piston from moving downward without the support tube.

While the support tube 14 is being locked to the ram piston 15A, the external detent 106 in the ram foot 15A is engaged by the spring-loaded wedge 105 in the ram case forging which prevents re-extension of the ram due to inertia forces in flight.

After a missile ejection is initiated, rising gas pressure below the bottom of the shroud tube 85 acts on the ram to overcome the wedge detent forces, allowing the ram 15 and support tube 14 to extend as one unit. As the support tube nears the end of its stroke, the ram case ends of the latches 82 engage in an annulus 86 in the ram case cylinder wall. Due to the angular contours of the ram piston groove 83 and the mating latch ends, the latches 82 are forced out of engagement with the groove 83, allowing the ram to continue independently to complete the full ram extension.

It can be seen that at the commencement of this last stage, the enlarged end 85A of the shroud tube 85 leaves the bore 114 in the ram 15 and opens the full volume of the ram case cylinder to the ejection cartridge gas, thereby allowing pressure to act upon the full diameter of the ram piston 15A.

Figure 3:
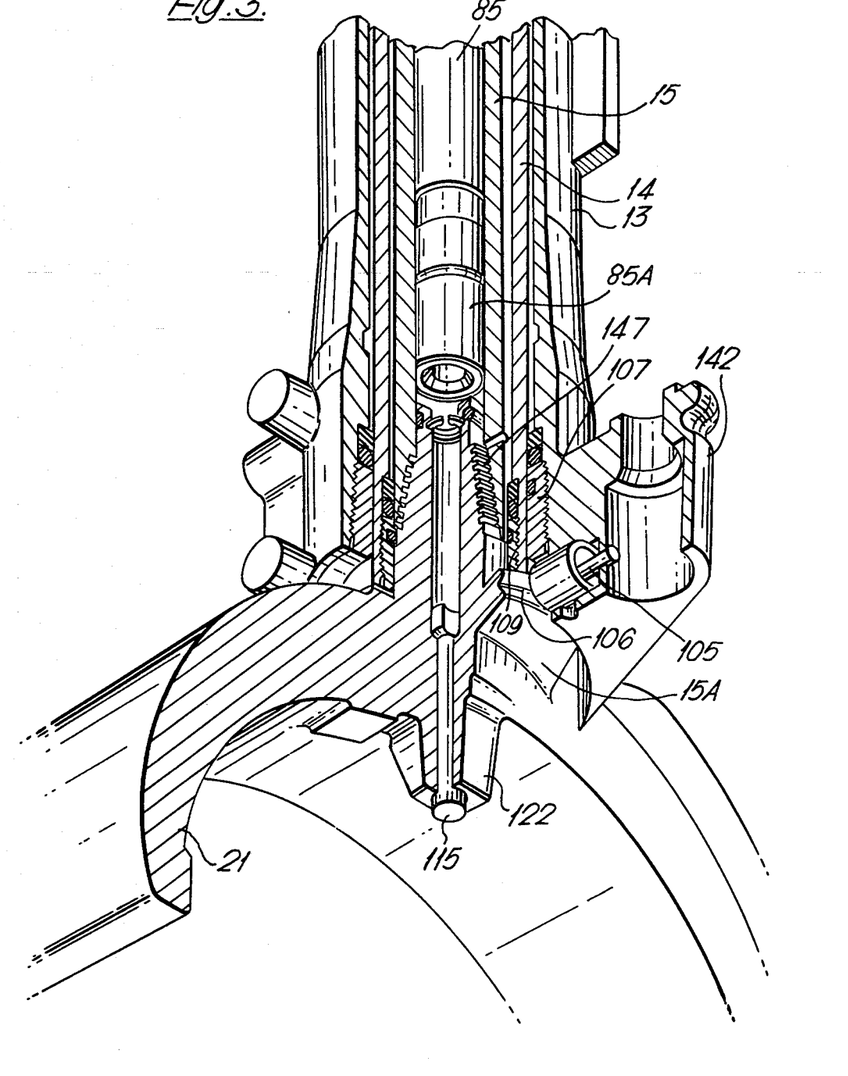
FIG. 3 is a pictorial cut-away diagram of the lower part of the aft ram.

On completion of the full ram stroke, and the separation of the missile from the launcher, a vent valve 35 located in the ram foot 15A and previously held closed by the missile casing, opens to allow the residual gas in the ram to vent to atmosphere. With a missile loaded, a plain part of the vent valve stem 115 seals its housing bore 116 in the ram foot, but with the missile ejected, ram gas pressure ejects the stem 115 to the limit of its travel, allowing the gas to exhaust to atmosphere via flutings 117 in the stem.

On the forward ram (FIG. 4), the ram foot 15A carries a sole plate 118 that can swing in an arc on a fore to aft axis to accommodate any pitch imparted to the missile during ejection. The freedom of the sole plate 118 in the longitudinal plane is achieved by radiused parallel tongues 119 on the ram foot 15A engaging mating grooves 120 in the sole plate. A slot 121 in the sole plate, located between the grooves 120, gives the vent valve stem 115 access to the missile surface. The protrusion of the vent valve through the sole plate provides a limit stop to sole plate articulation. The sole plate 118 is substantially rectangular in plan and its under surface is curved to match the radius of the missile. For crutching purposes a shoulder is formed on the upper surface of the sole plate, so as to project into the launcher body to engage the crutching facility therein.

Figure 4:
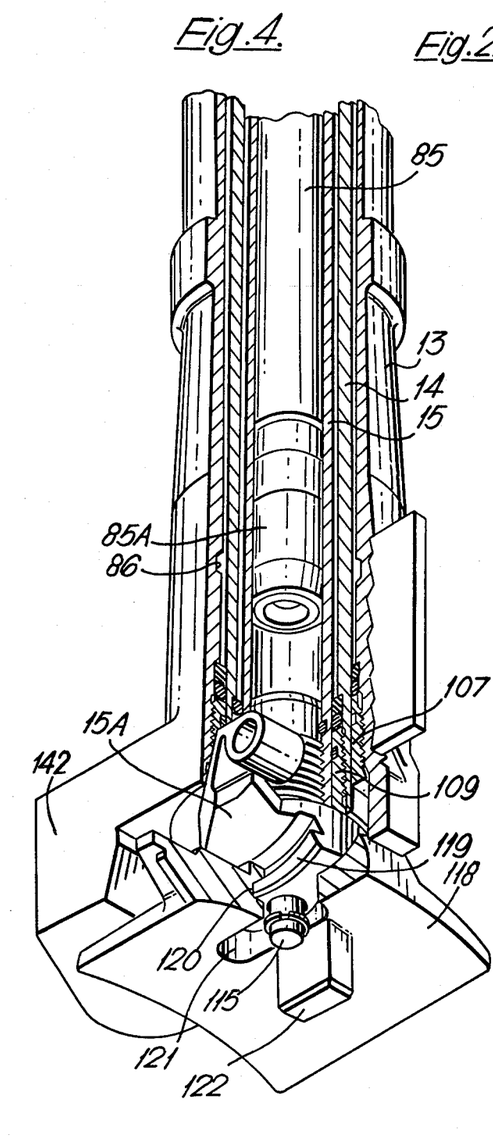
FIG. 4 is a pictorial cut-away diagram of the lower part of the forward ram.

Both the sole plate 118 on the foot 15A of the forward ram and yoke 21 on the foot of the aft ram have locating spigots 122 which engage in matching recesses in the missile casing. The aft ram yoke 21 half-encircles the suspended missile. In the yoke 21, the missile-locating spigot 122 is bored to accommodate the vent valve stem 115. The outer diameter of the yoke 21 incorporates a shoulder on one side of the ram foot for the purpose of providing a level smooth platform on which the crutching facility bears.

Figure 5:
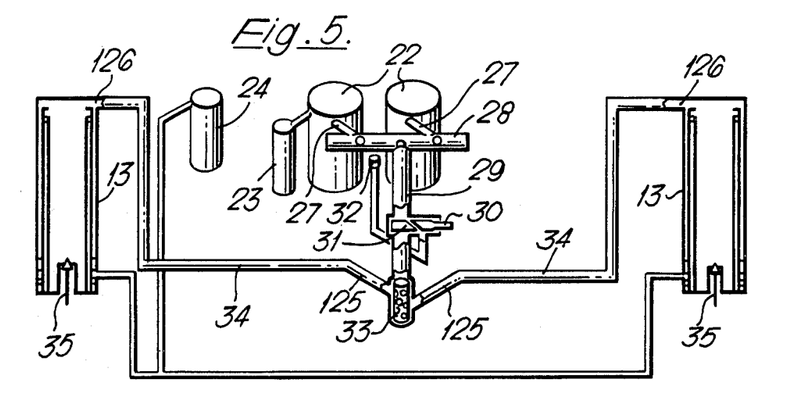
FIG. 5 is a flow diagram of the gas system of the launcher.
Figure 6:
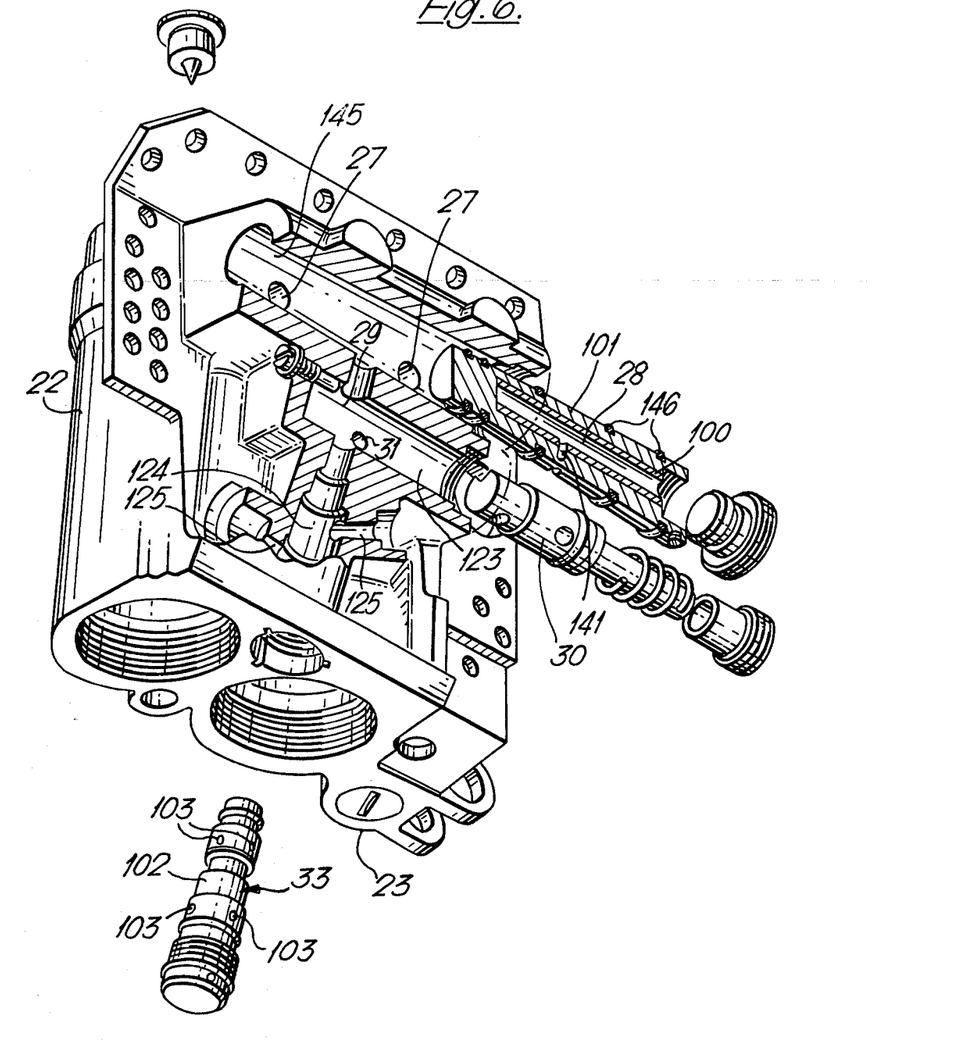
FIG. 6 is an exploded and partly cut-away pictorial diagram of the main breech assembly of the launcher.

Referring again to FIG. 1, there are two breech forgings mounted side by side on one face and towards the aft end of the main body channel member 11. One forging 22 houses two ejection cartridges and an expansion chamber 23 (FIGS. 5 and 6). The other forging 24 houses a single retraction cartridge. The breech chambers are closed by cartridge-holding caps 25 incorporating a cartridge case extracting arrangement.

The ejection cartridge breech forging 22 is semi-inset into the main body member 11, to allow a hook-release actuating piston in the breech forging to connect with the hook linkage within the main body member, and to provide access to the breech caps 25, which are on the outside of the launcher.

When missile ejection is initiated, a primary ejection cartridge and the retraction cartridge are fired simultaneously, combustion of the ejection cartridge is immediate, but combustion of the retraction cartridge is retarded by a pyrotechnic delay fuse. The gas from both ejection cartridges emerges from ports 27 into a single choke tube 28 interconnecting both breeches. The coked flow of gas then issues into a manifold 29 that communicates with the cylinder 123 of the hook-release actuating piston 30. A port 31 from the cylinder 123 communicates with a pressure-relieving rupture disc 32. The manifold 29 also communicates with a throttle chamber 124 containing a pitch control throttle assembly 33 that feeds into gas ducts 125 in the breech forging which lead to pipes 34 connecting the breech forging to the rams.

The choke orifices are advantageously provided in the form of two lateral bores in a tapering plug 101 that communicate with an internal passage 100 in the plug, from which passage gas flows out through a single further bore 141 into the manifold 29. The plug 101 fits into a tapered bore 145 in the breech forging 22 which communicates with the ports 27. The plug is provided with external seal rings 146.

The gas vent to atmosphere via the port 31 prevents bursting of the breech in the event of the piston 30 failing to move sufficiently soon. The rupture disc 32 avoids unnecessary loss of gas. The control throttles of the throttle assembly 33 are provided as pairs of axially-spaced bores 103 in a common valve plug 102, there being three sets of such bores disposed equi-angularly around the plug so that different gas ratios can be achieved as between the fore and aft rams by simply adjusting the plug 102 angularly.

Figure 2A:
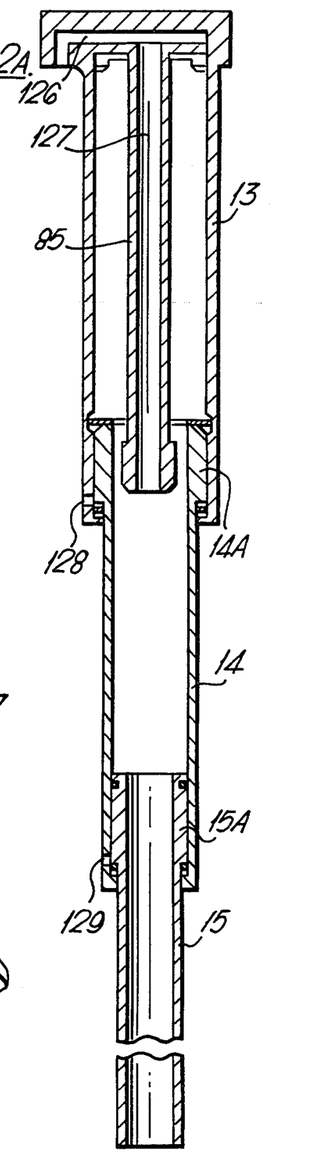
FIG. 2A is a diagram illustrating ram operation.

Gas pressure from the primary ejection cartridge operates the hook-release actuating piston 30, and then enters the rams through passages 126 (FIG. 2A) at their upper ends and through passages 127 within the shroud tubes 85 to commence missile ejection. At the same time, the hot gases in the choke tube sympathetically ignite the secondary ejection cartridge, which sustains system gas pressure as the initial combustion pressure from the primary cartridge decays. As the rams complete their extension, the vent valves 35, held closed by the body of the missile, open as the missile is ejected, allowing the residual gas pressure to vent to the atmosphere. Shortly afterwards retraction cartridge gas pressure, acting first on the underside of the support tube piston 14A through port 128 and then on the underside of the ram piston 15A through port 129, retracts the support tube and ram and latches them into their original positions.

Although the general dimensions of the ejection cartridges are similar, interchangeability is prevented by mechanical differences in the cartridge holders.

Figure 7:
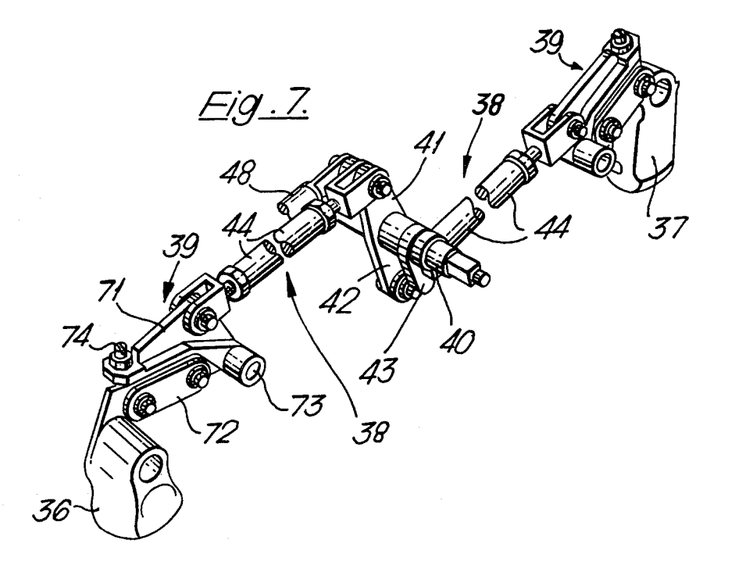
FIG. 7 is a pictorial diagram of the suspension hook operating linkage of the launcher.

Both of the missile suspension hooks and the umbilical plug withdrawal mechanism are located in the main body channel member 11. The forward hook 36 is centrally located between the body ends, and the aft hook 37 is adjacent to the aft ram casing base. The linkage 38 and overcentre links 39 are similar but the hooks differ as shown in FIG. 7.

Between the hooks 36, 37 and immediately forward of the ejection cartridge breech 22 is a lever assembly, the pivot pin 40 of which rotates in two bearings, one in a mounting flange of the ejection cartridge breech forging, and the other in the body channel wall opposite to the breech forging. The lever assembly incorporates two diametrically opposed levers 41, 42 in the vertical plane, and an actuating lug 43 which is contacted by the piston rod of the ejection breech forging actuating piston 30. The diametrically opposed levers 41, 42 are each connected to a respective hook by rods 44 and geometric over-centre linkages 39. The lower lever operates the aft hook and the upper lever operates the forward hook. The umbilical plug withdrawal mechanism is operated by a third lever 45 (FIG. 8) adjacent to the upper hook lever.

Each over-centre link assembly 39 consists of a locking lever 71 and a link 72. The locking lever 71 pivots, at one end, on a pin 73 secured to the launcher body, and has two vertical members extending above and below a flat horizontal section. The upper member is drilled to accommodate the clevis pin of the hook toggle connecting rod link 44, and the lower member mounts the pivot pin of the over-centre link 72 which is connected to the hook 36 or 37. As the hook is closed from its open position, the hook toggle connecting rod 44 causes the locking lever 71 to pivot on its fixed pin 73, thereby applying pressure on the hook in a closing direction, via the locking lever pivot pin and the link 72. This movement continues until the hook is fully closed, and the locking lever pivot and the two link pivots are all in line.

With the hook fully closed, the locking lever 71 continues to move over this dead centre position until a set-screw 74 on the locking lever contacts the link below it. Thereafter, no force applied to the hook can open it. Small adjustments to the angle of the over-centre can be made by rotating the set-screw 74.

In addition to the internal levers described, another external lever assembly is attached to the pivot pin 40. This lever assembly is a toggle for the manual operation of the hook linkage, and is keyed on to the breech forging end of the lever assembly pivot pin.

Figure 8:
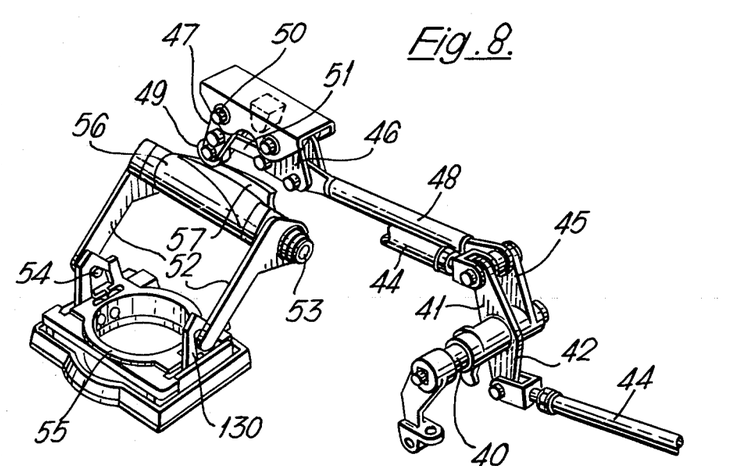
FIG. 8 is a pictorial diagram of the umbilical plug withdrawal mechanism of the launcher, FIGS. 9 and 9A constitute a cut-away pictorial diagram of the forward ram foot crutching assembly.

The umbilical plug withdrawal mechanism is in two parts, as shown in FIG. 8. One part consists of a bracket mounted assembly that fits into, and is secured to, the inside of the main channel member 11 of the body. This assembly consists of a geometric over-centre link 46 which is connected by a link 48 to the lever 45, and drives a roller lever 47. The roller lever is pivoted at one end 50, terminates in a stop at the other end and carries an intermediate roller 49. A swinging movement is imparted to the roller lever 47 by a link 51 connecting the roller lever to the over-centre mechanism 46 when the hooks 36, 37 are operated.

The roller lever 47 operates the second part of the withdrawal mechanism, which consists of a fork 52 that can move about a longitudinal pivot pin 53. The inside of each fork leg end has a pin 54 which engages an umbilical plug carrier 55. On the back of the fork bearing housing 56 is an angled projecting cam or ramp 57, the edge of which engages between the roller 49 and stop of the roller lever 47. Thus, when operation of the hooks causes the roller lever 47 to swing, pressure is applied to the cam ramp 57 of the fork. The fork then swings on its pivot withdrawing the umbilical plug in its carrier 55 from the missile socket.

The umbilical plug carrier 55 is a casting with a central hole that houses the umbilical plug, and contoured hooks 130 each side of the hole receive the pins 54 on the fork arms 52. The umbilical plug is inserted into the hole and has a locating spigot. A shear wafer, which carries the interconnecting pins between plug and missile, is inserted into the plug sockets from below, until a shoulder on the wafer seats in the plug carrier hole. Plug and shear wafer are then held together by a central combined pin and securing screw. One half of the shear wafer pins project below the under surface of the plug carrier casting to engage the socket of the missile. The plug cable rises up the plug carrier housing tunnel and emerges at the top to connect with the aircraft wiring.

The forward ram sole plate crutching arrangement differs from that of the aft ram yoke, but both arrangements automatically take up the slack necessary for hook engagement, as the hooks close. As the hooks open, spring pressure maintaining the crutching lock is relieved, but the crutching pressure is not relieved until the missile is released.

The forward ram crutch (FIGS. 9 and 9A) consists of a fixed, coarse pitched threaded shaft 58 immediately adjoining a shoulder on the retracted ram sole plate. The threaded shaft 58 has a conical nut 59 with an annular channel 60 in its upper periphery.

Figures 9, 9A:
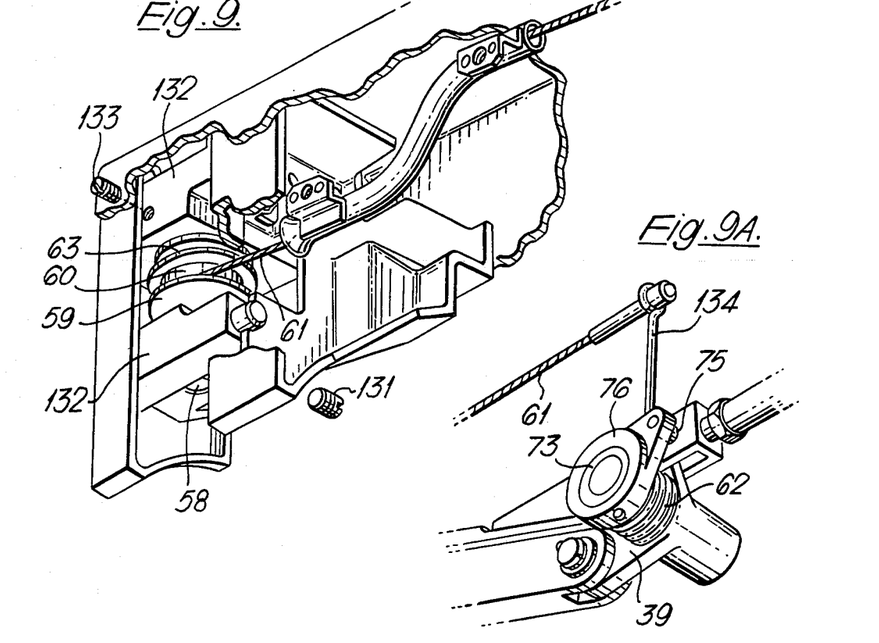

One end of a cable 61 is secured in the annular channel 60 and the other end is attached to a torsion spring 62 on the forward hook over-centre link 39. Above the crutching cone 59 is a compression torsion spring 63 which causes the cone to apply pressure on the ram sole plate crutch pad when the hooks 36, 37 are closed. When the forward over-centre link 39 opens the hook 36, the torsion spring 62 applies tension on the cable 61 and rotates the cone 59, relieving the pressure on the crutch pad.

The ends of the threaded spindle 58 are machined into spigots, and as the spindle is not intended to rotate the lower spigot is locked in its housing, in a predetermined position, by a grub-screw 131 in the side of the lower member of the support bracket 132. The upper spindle spigot is engaged by a hexagon headed threaded bush that is screwed through the top of the bracket 132, and lightly tightened, after the spindle, the conical nut, and the spring 63 have been assembled in the support bracket.

The pitch of the spindle threads is such that just over half a revolution of the conical nut 59 encompasses the full range of movement from top to bottom. The nut is driven towards the bottom of the threads, when the launcher hooks 36, 37 are closed, by the helical spring 63. The spring encircles the spindle and is secured to the top of the conical nut at one end. The other end of the spring is bent upwards to form a peg that locates in the support bracket, and is retained there by a grub-screw 133. During unit assembly the spring 63 is tensioned so that the conical nut is driven to the bottom of the thread. The arrangement described ensures that the angled surface of the conical nut is always in contact with the matching surface of the ram sole plate pad when the forward ram is retracted and the hooks 36, 37 are closed.

Also, during assembly, the spindle 58 is positioned so that just over one half turn of the cable 61 is wound on the conical nut in the opposite direction to the helix of the nut spring 63, with the nut at the bottom of its travel. Thus, any torque applied by the cable 61 greater than the torque applied by the nut spring 63 causes the conical nut to rise on its spindle towards the top of its travel, thereby releasing the crutching.

At the other end of the cable 61, the torsion spring 62 is pre-loaded. With the hooks 36, 37 closed, the spring arm 134 holds the cable taut but cannot apply significant tension because it engages a spring post 75 on a collar 76. When the hooks 36, 37 open, the spring post on the collar moves round with the over-centre link locking lever boss, allowing the spring pre-loading to be applied to the cable, thereby winding the cone of the conical nut 59 out of engagement with the crutching pad. Should binding between the crutching pad and nut cone prevent rotation of the nut, the over-centre link will continue rotating, but the torsion spring arm 134 will lift off the spring post 75, and the applied spring load will be increased until the nut releases.

The crutching of the aft ram yoke (FIGS. 10 and 10A) operates on a wedge principle. A bracket-mounted wedge 64 in the body channel member 11 above a shoulder 66 on the ram yoke 21 can slide on a guide rod 65 angled upwards, relatively to the yoke shoulder 66. With the ram retracted and the hooks 36, 37 closed, a torsion spring 67 encircling the pivot of the aft hook 37 forces the wedge 64 down the guide 65 into contact with the yoke shoulder 66. When the hooks 36, 37 open, a slotted block 68 on the aft hook 37 moves the leg 69 of the loading spring 67, relieving the pressure on the wedge 64. A secondary spring 70 then acts through the rod 135 to disengage the wedge 64 from the yoke shoulder 66.

Figure 10:
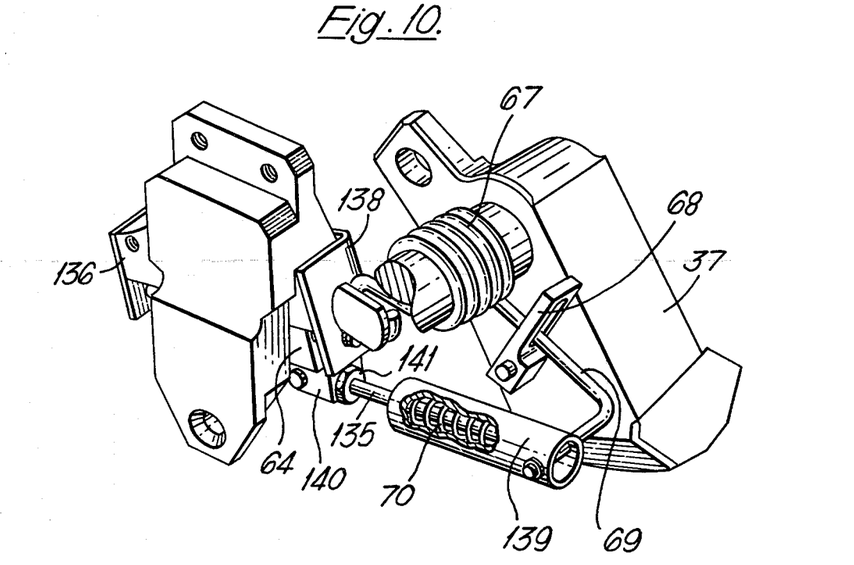
FIG. 10 is a pictorial diagram of the aft ram yoke crutching assembly.
Figure 10A:
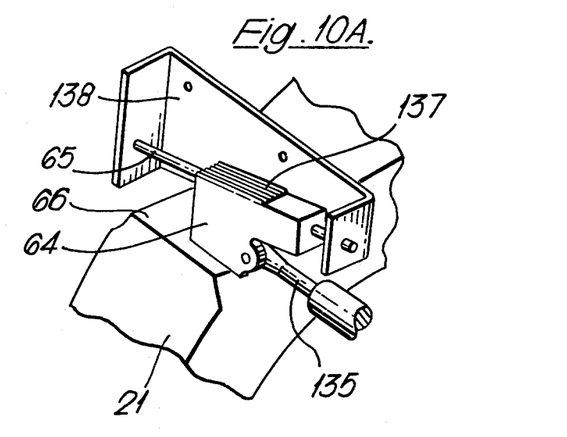
FIG. 10A is a pictorial diagram showing the crutching wedge of the assembly of FIG. 10.
Figure 11:
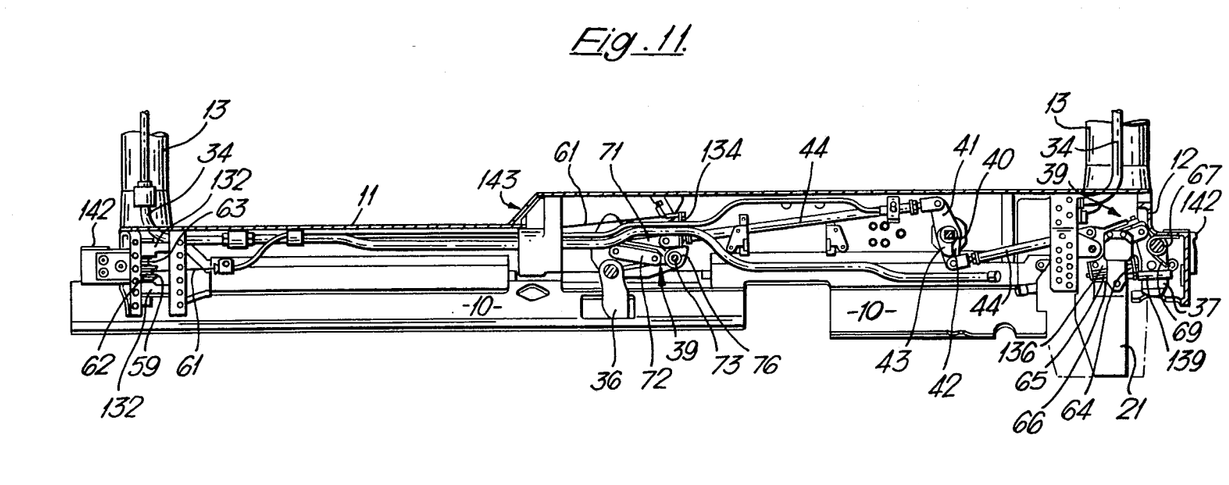
FIG. 11 is a side elevation of the launcher with the casing in section to show the disposition of the hook-operating and crutching mechanisms.

A ramp 136 against which the wedge 64 slides has triangularsection longitudinal serrations which match similar serrations 137 in the upper surface of the wedge. The serrations increase the load bearing surface area, and enhance the effect of frictional forces under load. The wedge guide rod 65 is secured between the ends of a retaining bracket 138.

The spring 70 is contained in a tube 139 which has the leg 69 of the spring 67 connected to one end. The tube also houses a piston on the rod 135, and the spring 70 encircles the rod and acts between the piston thereon and the other end of the tube. The rod 135 passes out through a central guide hole in the end of the tube and terminates in a threaded end which carries a fork 140 and locknut 141. The fork is connected to the wedge 64.

During assembly, the torsion spring 67 is tensioned to apply pressure on the wedge 64, via the tube 139, the piston and the rod 135 forcing the wedge down the wedge ramp into contact with the aft ram yoke. The pressure is only applied, however, when the aft hook 37 is closed. Should the load on the wedge upper and lower faces be such as to prevent its withdrawal as the hook 37 opens, the compression spring 70 in the tube 139 is compressed. The load in the rod 135 is thus sufficient to retract the wedge 64 when it is no longer constrained, i.e. when the ram extends.

The missile is ejected downwards in the plane of the wing and fin pockets in the aircraft, and is retained in this plane until ejection is complete. A predetermined degree of pitch, however, may be applied during the ejection. The configuration of the launcher is such that the aft ram centre-line is at a position slightly forward of the aft hook 37, and is behind the missile centre of gravity. The forward ram centre-line is sited forward of the C.G. Because of the relative ram positions fore and aft of the missile C.G., the aft ram has a larger diameter than the forward one to provide a larger proportion of the ejection force. The stroke of the forward ram is longer than that of the aft ram, to assist in applying the required pitch to the missile during ejection.

The launcher hooks 36, 37 pivot within the launcher in the fore to aft plane. The missile suspension fitting attachment faces on the hooks are angled at 45° to match the missile fitting faces. There is a natural tendency for the missile to roll downwards, about the hook contact faces, under normal 'g' loading, and one of the functions of the aft ram yoke and the associated spigots on both rams is to counter this tendency.

The launcher is bolted to the aircraft at two points above the missile centre-line. These launcher attachments 142 are integral with the ram casings 13, and are at the extreme ends of the launcher. The aft launcher mounting bolt rigidly secures the launcher to the aircraft and the forward mounting bolt allows a small amount of launcher movement relative to the air-frame in the fore and aft sense. A third attachment 143 is located near the longitudinal centre of the body channel.

This mounting is designed to react downward loads only, and is provided to limit downward deflections at the forward hook 36.

There are five switch units, four being operated by the ram torque links and one by the hook linkage. The forward ram torque links operate the forward ram deployed and forward ram retracted switches, and the aft ram torque links operate the aft ram deployed and ram retracted switches. The hook switch is operated by the forward hook over-centre link.

Since there is a large bending moment to be transmitted between the yoke 21 and the aft ram, a screwed connection with a tapering thread 147 is employed. By this means it is possible to get the required thicknesses of the respective components at the proper ends of the joint.

The design of the gas system gives even acceleration of the missile during ejection and sufficient gas stiffness to prevent interaction of the ejector rams; i.e. if one ram is impeded the stroke of the other ram is not affected. The adoption of dynamic alleviation of side loads on the ram enables the smallest and lightest design of ejector ram to be employed, i.e. the ram is not subject to load long enough for the full deflections to occur. The design of the breech gives automatic venting to atmosphere in the event of a 'hang fire' caused by the inadvertent non-removal of the safety pin.

The ram design has to permit the inner and outer rams to eject simultaneously to provide the strength to react initial side loads. This would normally mean that the two areas of the rams are combined when peak pressure is experienced from the cartridges and this would be quite contrary to the requirement for uniform acceleration. The design therefore includes a central shroud tube 85 in each ram which effectively reduces the total surface area exposed to pressure while both rams descend simultaneously.

We claim:

1. A missile launcher provided with gas-pressure-actuated fore and aft ejection rams, and a choked flow gas system comprising breech chambers to contain gas cartridges, a gas manifold to receive a single pressure-gas flow from the cartridges in the breech chambers, said single gas flow being divided downstream of said manifold into two gas flows for distribution, respectively, to said fore and aft ejection rams, and fore and aft gas ducts feeding the two pressure-gas flows downstream of the manifold to said fore and aft ejection rams, and wherein a choke device is disposed upstream of said manifold through which choke device the single pressure gas flow from the cartridges in the breech chambers passes before it is divided and distributed downstream of said manifold to the fore and aft ejection rams.

2. A launcher according to claim 1, comprising automatic latches in the rams to hold the rams in the retracted condition.

3. A launcher according to claim 1, comprising torque links preventing rotation of the rams on extension.

4. A launcher according to claim 3, wherein switches initiating starting of the missile propulsion system are actuated by the torque links.

5. A launcher according to claim 1, wherein the rams are both two-stage double-acting rams and the aft ram is of larger diameter than the forward ram.

6. A launcher according to claim 1, comprising fore and aft releasable suspension hooks to carry the missile and fore and aft crutching assemblies to hold the suspended missile secure.

7. A launcher according to claim 1 or claim 5 or claim 6, comprising gas venting valves at the bottom ends of the rams which are held closed by the missile body when a missile is present but open to release residual ejection gas when the missile departs.

8. A launcher according to claim 1 or claim 5 or claim 6, wherein the stroke of the forward ram is longer than that of the aft ram to apply a degree of pitch to the missile on ejection.

9. A launcher according to claim 1 or claim 5 or claim 6, wherein each ram comprises a casing, a relatively fixed inner hollow shroud tube, and two relatively moving members bearing annular pistons and extending telescopically from the space between the casing and shroud tube, the ejection gas being admitted down the interior of the shroud tube.

10. A launcher according to claim 6, wherein the aft ram carries a yoke to engage the missile body, the forward ram carries a swingably mounted sole plate to engage the missile body, and the fore and aft crutching assemblies are associated with the sole plate and the yoke, respectively.

11. A launcher according to claim 10, wherein the aft suspension hook is situated in the region of the yoke and the forward suspension hook is situated intermediate the yoke and the sole plate.

12. A launcher according to claim 6, comprising an umbilical plug withdrawal assembly to withdraw an umbilical electrical service plug carrier from the missile on ejection.

13. A launcher according to claim 12, wherein the suspension hooks are actuated by an angularly-moving lever assembly having levers connected to respective hooks by respective connecting rods and over-centre linkages.

14. A launcher according to claim 13, wherein the umbilical plug withdrawal assembly comprises a further lever of the angularly-moving lever assembly which actuates, via an over-centre linkage and a cam-and-roller mechanism, a fork with fork arms that engage hooks on the umbilical plug carrier.

15. A launcher according to claim 13, wherein the forward crutching assembly comprises a coarse-threaded shaft, a coned nut to engage on a surface of the forward ram sole plate, a torsion spring urging the nut into engagement, and a cable that can be tensioned to rotate the nut out of engagement.

16. A launcher according to claim 15, wherein the cable is tensioned by a spring associated with the linkage between the angularly-moving lever assembly and the forward suspension hook.

17. A launcher according to claim 13, wherein the aft crutching assembly comprises a spring-loaded wedge engaging a surface on the ram yoke.

18. A launcher according to claim 17, wherein the spring loading the crutching wedge is associated with the aft suspension hook so that when the aft hook is released the spring loading is relieved and a secondary spring can act to withdraw the wedge.

19. A launcher according to claim 12, wherein the pressure gas system is arranged to release the suspension hooks and crutching assemblies, operate the umbilical plug withdrawal assembly and extend the rams, on ejection, and to retract the rams after launch.

20. A launcher according to claim 22, wherein gas issuing from the choke device also enters the cylinder chamber of an actuating piston to release the suspension hooks and crutching assemblies and operate the umbilical plug withdrawal assembly.

21. A launcher according to claim 20, wherein the cylinder chamber of the actuating piston has a vent closed by a rupture disc.

22. A launcher according to claim 19, comprising three breech chambers to contain two ejection gas cartridges and one retraction gas cartridge, the ejection cartridges being fired in sequence and the retraction cartridge after a delay, and wherein the gas from the breech chambers containing the ejection cartridges enters said choke device and flows thence via a throttle valve assembly to the upper ends of the ram casings, and the gas from the breech chamber containing the retraction cartridge is delivered to the lower ends of the ram casings.

23. A launcher according to claim 22, wherein the choke device comprises a tapering plug with a central passage, two inlets into the central passage communicating with outlet ports of the ejection cartridge breech chambers, and a single outlet from the central passage.

24. A launcher according to claim 22 or claim 23, wherein the throttle valve assembly comprises a rotatable valve plug with two axially spaced throttling bores delivering gas respectively to the two rams, the plug having a set of different-sized throttling bores for each ram such that different-sized bores can be brought into use by angular adjustment of the valve plug thereby changing the gas supply ratio to the two rams.

25. A missile launcher provided with gas-pressure-actuated fore and aft ejection rams and a choked flow gas system comprising:
  breech chambers for receiving gas cartridges,
  a gas manifold,
  a choked flow device located between said breech chambers and said gas manifold,
  a common gas flow channel and
  fore and aft gas flow ducts extending from said common gas flow channel to the fore and aft rejection rams,
  said common gas flow channel communicating with said manifold.

* * * * *